United States Patent [19]
Keys

[11] 3,822,066
[45] July 2, 1974

[54] SEAL
[75] Inventor: Marvin C. Keys, Metamora, Ill.
[73] Assignee: Caterpillar Tractor Co., Peoria, Ill.
[22] Filed: Sept. 18, 1972
[21] Appl. No.: 289,939

Related U.S. Application Data
[63] Continuation of Ser. No. 805,218, March 7, 1969, abandoned.

[52] U.S. Cl. .................................. 277/96, 277/88
[51] Int. Cl. ............................................ F16j 15/54
[58] Field of Search .......... 277/96 R, 96 A, DIG. 6, 277/88

[56] References Cited
UNITED STATES PATENTS
| | | | |
|---|---|---|---|
| 2,425,209 | 8/1947 | Snyder et al. | 277/96 X |
| 3,122,375 | 2/1964 | Greenwald | 277/96 X |
| 3,550,989 | 12/1970 | Hall | 277/96 |

Primary Examiner—Samuel B. Rothberg
Attorney, Agent, or Firm—Phillips, Moore, Weissenberger, Lempio & Strabala

[57] ABSTRACT

A seal, which may be utilized in suitable applications such as water pumps, having a resin impregnated carbon ring with 1 percent available porosity with a hardness in the range Rockwell C80. A ceramic ring, engaged in frictional contact with the carbon ring, has a minimum hardness of Rockwell 45N 78, and a surface having a maximum of 8 pores or valleys between 2 and 100 micro-inches in depth per 0.03 inch of cut-off length, the pores having a maximum diameter of 0.0015 inch and being uniformly distributed. Measurement of the number and size of the pores is made by means of a profilometer having a tip radius of 100 micro-inches.

6 Claims, 6 Drawing Figures

PATENTED JUL 2 1974 3,822,066

INVENTOR
MARVIN C. KEYS

BY
Fryer, Tjensvold, Feix, Phillips & Lempio
ATTORNEYS

PATENTED JUL 2 1974

INVENTOR
MARVIN C. KEYS

BY

ATTORNEYS

SEAL

This is a continuation, of Ser. No. 805,218, Filed Mar. 7, 1969 and now abandoned.

BACKGROUND AND SUMMARY OF THE INVENTION

In the past several years, attempts have been made to make a more economical and reliable seal, such as could be used in a water pump. In an effort to improve reliability, such designs have turned to the use of tungsten alloy rings which are usually mounted in the rotating part so as to engage a non-rotating carbon ring. From a cost standpoint however, tungsten rings are perhaps ten times more expensive than rings made of other materials, such as ceramic. On the other hand, considerable difficulty has been experienced with respect to the reliability of ceramic rings which appear to have a tendency to crack.

During the course of investigation, it has been discovered that there is a high torque load at the interface of the mating rings in a seal. This torque load seems to vary considerably within a given set of rings. In testing, it was discovered that if the torque rises from a low torque to a high torque within a fairly short time, the heat build-up within the ceramic ring is such that the ring tends to crack.

Such a change from low to high torque values also results in torsional vibration or constant cycling of the carbon ring such that the means for holding the ring within its supporting cup tend to become worn within a short period of time, allowing the carbon ring to hammer against the face of the mating ring, and thus contribute to the accelerated wear and/or failure of the seal components.

In conventional ceramic rings, a rough surface is normally provided which is almost immediately filled with carbon from the carbon ring when the seal is first put into use. In effect, this produces a carbon-to-carbon seal rather than a carbon-to-ceramic seal. When water is used as the lubricant in such a seal, the interface torque remains fairly low. However, if soluable oil or anti-freeze solution is introduced, the torque increases significantly, resulting in the above described failures. The pores in the ceramic ring which are open to the surface collect oil and carbon, presenting a carbon-to-carbon surface, resulting in the rapid, significant increase in torque as described.

As a result of these experiments, it has been found that the ceramic rings should have smooth, hard surfaces.

In the present invention it has been found that a vastly improved result is attained by having two opposing surfaces in contact which present hard surfaces with as large plateus (distance between pores) as possible for surface engagement. There should be as few pores or pits therein as can be economically produced in the types of materials utilized. Use of such materials produces running surfaces which have very low torque values generated by the friction contact, which values remain fairly constant over the range of operating temperatures of the engine coolant, regardless of the composition of the coolant.

It is therefore an object of this invention to provide an improved seal.

It is also an object of this invention to provide a seal having relatively non-porous engagement surfaces between the relatively rotatable parts of the seal.

Other objects and advantages of the present invention will become apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

DETAILED DESCRIPTION

Figure 1:
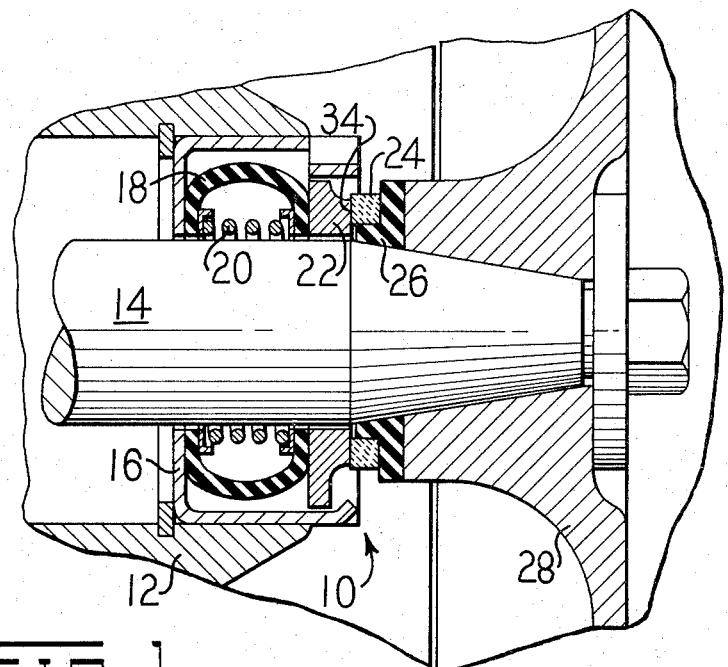
FIG 1 is a simplified, sectional illustration of the seal of the present invention in one environment in which the seal may be utilized.

Referring now to FIG. 1, there is shown a seal 10 which is mounted within a water pump housing 12 surrounding a shaft 14. In a simplified description, the seal consists of a cup-like member 16 which supports a bellows 18 and a spring 20. The spring applies pressure against a carbon ring 22 which engages a ceramic ring 24 in rubbing contact at an interface 34.

The ceramic ring is driven through a rubber bushing 26, or may be mounted directly to a pump impeller 28.

Figure 2:
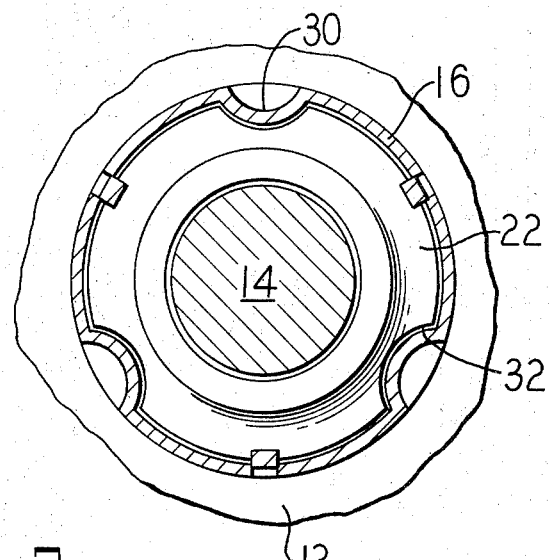
FIG. 2 is an end view of the non-rotatable ring of the seal, illustrating the manner of holding the ring in fixed position.

As shown in more detail in FIG. 2, the carbon ring is prevented from rotating by means of indentations 30 in the cup member 16 which engages notches 32 in the carbon ring.

Although the above description relates to a typical environment for the seal, it is conceivable that the seal may be utilized in many other environments other than water pumps.

As explained above, low torque at the interface 34 must be maintained if wear and cracking failures are to be held at a minimum, since low torque reduces the effect of torsional vibration.

In order to keep the torque at a minimum, it has been found that proper selecting and construction of the materials utilized in the carbon and ceramic rings is extremely important.

The carbon ring should be a resin impregnated carbon, having 1 percent available porosity, and a hardness in the range of Rockwell C80. Such rings are presently commercially available.

With respect to the ceramic ring, the general configuration of the ring may be identical to that utilized in earlier models of the seal, but the texture and the surface finish must be significantly different.

As explained earlier, it has long been thought that the use of a rough, porous ceramic ring is beneficial in a seal since the pores tend to accept carbon from the carbon ring and give a carbon-to-carbon interface. Such an interface contact will produce a relatively low torque so long as the coolant comprises water only. However, if soluable oil or anti-freeze is added to the water, the torque at the carbon-to-carbon interface rises rapidly and in many cases, a "sticky mass" gathers at the interface.

Figure 3:
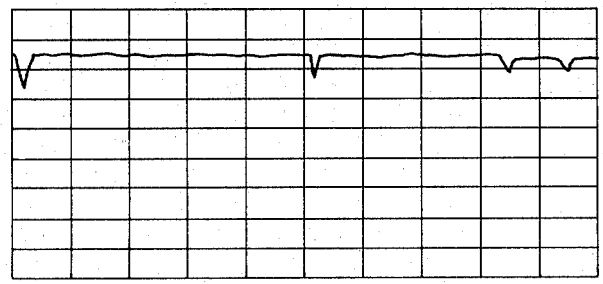
FIGS. 3 and 4 illustrate a representative profilometer trace and porosity magnitude chart of the ceramic ring utilized in the present invention.
Figure 4:
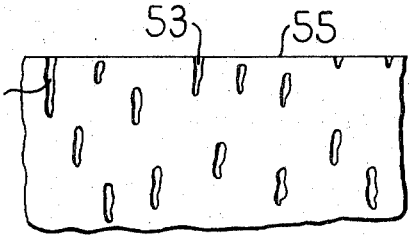

With reference to FIGS. 3 to 6, the ceramic ring which maintains a torque at a low level regardless of the coolant used, should produce a profilometer trace similar to that shown in FIG. 3, with a porosity, which is not accurately shown but which is represented in FIG. 4.

Figure 5:
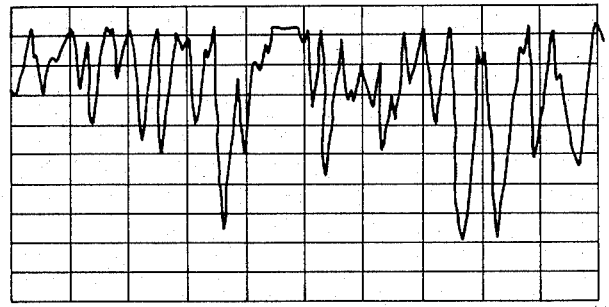
FIGS. 5 and 6 are similar to FIGS. 3 and 4, respectively, and illustrate the same aspects of a prior art ceramic ring.

In both FIGS. 3 and 5, the intervals between the horizontal lines represent 10 micro-inches and the intervals between the vertical lines represent 0.002 inch.

Figure 6:
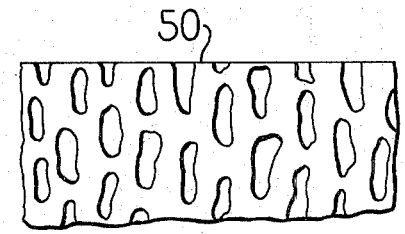

An examination of the differences in the profilometer traces shown in FIGS. 3 and 5 and the ring porosities represented by FIGS. 4 and 6 are believed to provide a suitable illustration of the surface quality improvement required in the present invention. The purpose of illustrating this comparison, particularly with respect to FIGS. 4 and 6, is to point out the significance of having a control of both the porosity as well as the surface finish. As can be appreciated, if the surface 50 shown in FIG. 6 were to be finished in an attempt to eliminate the surface roughness, the finishing would result only in opening up new pores to the surface.

Therefore, to produce the desired result, it has been found that the ceramic ring should have a hardness of approximately Rockwell 45N78. Further, per 0.30 inch of cut-off length having a surface analysis with a profilometer tip having a radius of 100 micro-inches should result in a maximum of 8 pores or valleys, as illustrated at 51 and 53 in FIGS. 3 and 4, uniformly distributed throughout the surface 55, of the cut-off length, having a depth of preferably not more than 2 micro-inches, but definitely not more than 100 micro-inches. Further, the diameter of any pore should not be greater than 0.0015 inch for optimum results.

Thus, a seal has been disclosed which produces a true advance in the art since the seal is more economical and reliable than various types of seals presently available. Although only a single embodiment of the invention has been illustrated and described, it will be realized by those skilled in the art that changes may be made in the seal construction and ring parameters, without exceeding the purview of the following claims.

What is claimed is:

1. In a seal having a carbon ring and a porous ceramic ring in rubbing contact under relative rotation, said ceramic ring having a rubbing surface finish greater than zero but not more than 8 pores per 0.03 inch of cut-off length, the pores in the ceramic ring being uniformly distributed throughout the rubbing surface, and having a depth greater than zero but no greater than 100 micro-inches, and a diameter greater than zero but no greater than about 0.0015 inch.

2. The seal member of claim 1 further including means for preventing rotation on said carbon ring whereby said carbon ring may be held from relative rotation with respect to said ceramic ring.

3. The seal member of claim 2 wherein said rotation preventing means comprises a plurality of spaced notches on the periphery of said carbon ring.

4. The seal of claim 1 wherein the ceramic ring rubbing surface has a hardness of not less than Rockwell 45N 78.

5. The seal of claim 4 wherein the carbon ring comprises a resin impregnated carbon having not more than approximately 1 percent available porosity.

6. The seal of claim 5 wherein the carbon ring rubbing surface has a hardness of approximately Rockwell C80.

* * * * *